(12) United States Patent
Kim

(10) Patent No.: US 10,829,634 B2
(45) Date of Patent: Nov. 10, 2020

(54) AROMATIC POLYMER COMPOSITION FOR USE IN A CAMERA MODULE

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 24 days.

(21) Appl. No.: 16/202,195

(22) Filed: Nov. 28, 2018

(65) Prior Publication Data
US 2019/0169427 A1 Jun. 6, 2019

Related U.S. Application Data

(60) Provisional application No. 62/746,757, filed on Oct. 17, 2018, provisional application No. 62/594,603, filed on Dec. 5, 2017.

(51) Int. Cl.
*C08L 67/03* (2006.01)
*G03B 17/02* (2006.01)

(52) U.S. Cl.
CPC ............. *C08L 67/03* (2013.01); *G03B 17/02* (2013.01); *C08L 2205/03* (2013.01); *C08L 2205/035* (2013.01); *C08L 2205/12* (2013.01); *C08L 2205/14* (2013.01)

(58) Field of Classification Search
CPC combination set(s) only.
See application file for complete search history.

(56) References Cited

U.S. PATENT DOCUMENTS

| | | |
|---|---|---|
| 3,419,517 A | 12/1968 | Hedrick et al. |
| 4,161,470 A | 7/1979 | Calundann |
| 4,172,859 A * | 10/1979 | Epstein .................. C08L 67/02 428/402 |
| 4,458,039 A | 7/1984 | Eickman |
| 4,888,127 A | 12/1989 | Wade et al. |
| 4,950,360 A | 8/1990 | Murao et al. |
| 5,352,746 A | 10/1994 | Asai et al. |
| 5,492,946 A | 2/1996 | Huspeni et al. |
| 5,503,919 A | 4/1996 | Litchholt et al. |
| 5,508,374 A | 4/1996 | Lee et al. |
| 5,538,666 A | 7/1996 | Jin |
| 5,616,680 A | 4/1997 | Linstid, III |
| 5,830,940 A | 11/1998 | Nakamura et al. |
| 5,847,039 A | 12/1998 | Nagashima et al. |
| 5,891,532 A | 4/1999 | Furuta et al. |
| 5,928,589 A | 7/1999 | Norota et al. |
| 5,962,122 A | 10/1999 | Walpita et al. |
| 5,997,765 A | 12/1999 | Furuta et al. |
| 6,010,760 A | 1/2000 | Miyazaki et al. |
| 6,046,300 A | 4/2000 | Umetsu et al. |
| 6,063,848 A | 5/2000 | Murakami et al. |
| 6,114,492 A | 9/2000 | Linstid, III et al. |
| 6,140,455 A | 10/2000 | Nagashima et al. |
| 6,153,121 A | 11/2000 | Makabe et al. |
| 6,221,962 B1 | 4/2001 | Heino et al. |
| 6,306,946 B1 | 10/2001 | Long et al. |
| 6,379,795 B1 | 4/2002 | Bisaria et al. |
| 6,492,463 B1 | 12/2002 | Waggoner |
| 6,495,616 B2 | 12/2002 | Maeda |
| 6,514,611 B1 | 2/2003 | Shepherd et al. |
| 6,680,002 B2 | 1/2004 | Yamauchi et al. |
| 6,702,955 B1 | 3/2004 | Murakami et al. |
| 6,702,956 B2 | 3/2004 | Maeda et al. |
| 6,730,378 B2 | 5/2004 | Matsuoka et al. |
| 6,733,691 B2 | 5/2004 | Nagano et al. |
| 6,755,992 B2 | 6/2004 | Okamoto et al. |
| 6,758,989 B2 | 7/2004 | Miyashita et al. |
| 6,797,198 B1 | 9/2004 | Miyashita et al. |
| 6,833,405 B1 | 12/2004 | Cottis |
| 6,861,463 B2 | 3/2005 | Cottis |
| 7,001,945 B2 * | 2/2006 | Nodera ................ C08G 77/448 524/451 |
| 7,079,405 B2 | 7/2006 | Tobita et al. |
| 7,166,238 B2 | 1/2007 | Kato et al. |
| 7,175,779 B1 | 2/2007 | Kricheldorf et al. |
| 7,189,778 B2 | 3/2007 | Tobita et al. |
| 7,250,127 B2 | 7/2007 | Geck et al. |
| 7,276,284 B2 | 10/2007 | Frohs |

(Continued)

FOREIGN PATENT DOCUMENTS

| | | |
|---|---|---|
| EP | 0 312 331 A2 | 4/1989 |
| EP | 0 312 331 A3 | 4/1989 |

(Continued)

OTHER PUBLICATIONS

Article—Liu et al., "Immobilization and melting point depression of imidazolium ionic liquids on the surface of nano-SiO$_x$ particles," *Dalton Trans.*, vol. 39, 2010, pp. 3190-3194.
Product Information—Sigrafil® C, The Carbon Fiber for Thermoplastic Compounds from SGL Group, 2009, 4 pages.
Product Information on Talc from the Nippon Talc Co., Ltd., 5 pages.
Product Information on Suzorite® 200-HK from Imerys, Jan. 2014, 1 page.
Technical Data Sheet on THOR-FPz from Laurel Products, LLC, 2017, 1 page.
International Search Report and Written Opinion for PCT/US2018/062760 dated Jan. 24, 2019, 11 pages.

*Primary Examiner* — Marc S Zimmer

(74) *Attorney, Agent, or Firm* — Dority & Manning, P.A.

(57) ABSTRACT

A polymer composition that contains an aromatic polymer in combination with a tribological formulation is provided. The polymer composition may exhibit a low degree of surface friction that minimizes the extent to which a skin layer is peeled off during use of a part containing the composition (e.g., in a camera module). For example, the polymer composition may exhibit a dynamic coefficient of friction of about 1.0 or less and/or a wear depth may be about 500 micrometers or less as determined in accordance with VDA 230-206:2007.

26 Claims, 1 Drawing Sheet

(56) References Cited

U.S. PATENT DOCUMENTS

| | | |
|---|---|---|
| 7,344,657 B2 | 3/2008 | Okamoto et al. |
| 7,438,832 B2 | 10/2008 | Majumdar et al. |
| 7,540,991 B2 | 6/2009 | Shimoyama et al. |
| 7,547,403 B2 | 6/2009 | Miyashita et al. |
| 7,601,771 B2 | 10/2009 | Schmidt et al. |
| 7,608,666 B2 | 10/2009 | Matsuoka et al. |
| 7,612,130 B2 | 11/2009 | Kim |
| 7,641,833 B2 | 1/2010 | Aoki et al. |
| 7,648,748 B2 | 1/2010 | Nakane et al. |
| 7,704,408 B2 | 4/2010 | Fukatsu |
| 7,740,770 B2 | 6/2010 | Mizumoto et al. |
| 7,776,410 B2 | 8/2010 | Nakane et al. |
| 7,789,670 B2 | 9/2010 | Fukatsu et al. |
| 7,824,572 B2 | 11/2010 | Okamoto |
| 7,825,176 B2 | 11/2010 | Kim et al. |
| 7,892,450 B2 | 2/2011 | Uchida et al. |
| 7,931,824 B2 | 4/2011 | Gin et al. |
| 7,960,473 B2 | 6/2011 | Kobayashi et al. |
| 7,980,897 B2 | 7/2011 | Fukatsu et al. |
| 7,985,351 B2 | 7/2011 | Yamauchi et al. |
| 8,029,694 B2 | 10/2011 | Saga |
| 8,066,907 B2 | 11/2011 | Kohinata et al. |
| 8,142,683 B2 | 3/2012 | Murouchi et al. |
| 8,178,608 B2 | 5/2012 | Nakamura et al. |
| 8,192,645 B2 | 6/2012 | Murouchi et al. |
| 8,202,448 B2 | 6/2012 | Fukuhara et al. |
| 8,231,805 B2 | 7/2012 | Fukuhara et al. |
| 8,270,103 B2 | 9/2012 | Miyawaki et al. |
| 8,272,879 B2 | 9/2012 | Fukatsu et al. |
| 8,324,307 B2 | 12/2012 | Harder et al. |
| 8,337,719 B2 | 12/2012 | Hosoda et al. |
| 8,432,484 B2 | 4/2013 | Christison |
| 8,440,780 B2 | 5/2013 | Hamaguchi et al. |
| 8,465,670 B2 | 6/2013 | Kondo et al. |
| 8,545,719 B2 | 10/2013 | Komatsu et al. |
| 8,603,356 B2 | 12/2013 | Suh et al. |
| 8,646,994 B2 | 2/2014 | Kim et al. |
| 8,658,057 B2 | 2/2014 | Nakayama et al. |
| 8,696,932 B2 | 4/2014 | Uchida et al. |
| 8,778,220 B2 | 7/2014 | Lee et al. |
| 8,778,222 B2 | 7/2014 | Matsubara et al. |
| 8,784,683 B2 | 7/2014 | Matsubara et al. |
| 8,834,741 B2 | 9/2014 | Shiraishi et al. |
| 8,906,259 B2 | 12/2014 | Kim |
| 8,926,862 B2 | 1/2015 | Kim et al. |
| 8,932,483 B2 | 1/2015 | Kim |
| 8,980,986 B2 | 3/2015 | Lee et al. |
| 9,023,462 B2 | 5/2015 | Lee et al. |
| 9,045,621 B2 | 6/2015 | Matsubara et al. |
| 9,045,685 B2 | 6/2015 | Nair et al. |
| 9,051,514 B2 | 6/2015 | Nair et al. |
| 9,085,672 B2 | 7/2015 | Matsubara et al. |
| 9,096,794 B2 | 8/2015 | Nair et al. |
| 9,109,111 B2 | 8/2015 | Lee et al. |
| 9,156,973 B2 | 10/2015 | Supriya et al. |
| 9,284,435 B2 | 3/2016 | Kim |
| 9,355,753 B2 | 5/2016 | Kim |
| 9,512,293 B2 | 12/2016 | Kim |
| 9,670,392 B2 | 6/2017 | Larson et al. |
| 9,788,647 B2 | 10/2017 | Joshi et al. |
| 9,822,254 B2 | 11/2017 | Kim |
| 9,862,809 B2 | 1/2018 | Kim et al. |
| 9,914,804 B2 | 3/2018 | Malet et al. |
| 9,994,771 B2 | 6/2018 | Hegi |
| 10,030,208 B2 | 7/2018 | Zia et al. |
| 10,106,682 B2 | 10/2018 | Kim |
| 10,280,282 B2 | 5/2019 | Kim |
| 10,287,421 B2 | 5/2019 | Kim |
| 2002/0064701 A1 | 5/2002 | Hand et al. |
| 2002/0172786 A1 | 11/2002 | Matsuoka et al. |
| 2002/0190432 A1 | 12/2002 | Shiwaku et al. |
| 2003/0096070 A1 | 5/2003 | Matsuoka et al. |
| 2005/0077498 A1 | 4/2005 | Kato et al. |
| 2005/0176835 A1 | 8/2005 | Kobayashi et al. |
| 2005/0191877 A1 | 9/2005 | Huang |
| 2005/0260361 A1 | 11/2005 | Alms et al. |
| 2006/0009580 A1 | 1/2006 | Alms et al. |
| 2006/0014876 A1 | 1/2006 | Bushelman et al. |
| 2006/0025561 A1 | 2/2006 | Watanabe et al. |
| 2007/0057236 A1 | 3/2007 | Hosoda et al. |
| 2007/0182059 A1 | 8/2007 | Ikegawa et al. |
| 2007/0190346 A1 | 8/2007 | Ikegawa |
| 2008/0048150 A1 | 2/2008 | Hosoda et al. |
| 2008/0161468 A1* | 7/2008 | Juikar ............... C08F 14/18 |
| | | 524/423 |
| 2009/0027586 A1 | 1/2009 | Kumai et al. |
| 2009/0109326 A1* | 4/2009 | Christison ........... H04N 5/2257 |
| | | 348/374 |
| 2009/0212684 A1 | 8/2009 | Saito et al. |
| 2010/0012354 A1 | 1/2010 | Hedin et al. |
| 2011/0171452 A1 | 7/2011 | Öttinger et al. |
| 2011/0189454 A1 | 8/2011 | Fukuhara et al. |
| 2011/0189455 A1 | 8/2011 | Fukuhara et al. |
| 2011/0204298 A1* | 8/2011 | Chang ................. C08L 23/06 |
| | | 252/508 |
| 2011/0210290 A1 | 9/2011 | Harada et al. |
| 2012/0135228 A1 | 5/2012 | Fukuhara et al. |
| 2012/0172508 A1* | 7/2012 | Jung .................. C08K 5/42 |
| | | 524/162 |
| 2012/0199790 A1 | 8/2012 | Yun et al. |
| 2012/0232188 A1 | 9/2012 | Nakayama |
| 2013/0015411 A1 | 1/2013 | Kang et al. |
| 2013/0052447 A1 | 2/2013 | Grenci et al. |
| 2013/0123420 A1 | 5/2013 | Kim |
| 2013/0200297 A1 | 8/2013 | Saga |
| 2014/0264183 A1 | 9/2014 | Kim |
| 2014/0316041 A1 | 10/2014 | Mehta |
| 2015/0038631 A1 | 2/2015 | Hamaguchi et al. |
| 2016/0075873 A1* | 3/2016 | Kaushik ............... C08L 67/025 |
| | | 524/230 |
| 2016/0340506 A1* | 11/2016 | Agarwal .............. D21F 1/0027 |
| 2017/0029682 A1 | 2/2017 | Kim et al. |
| 2017/0106418 A1 | 4/2017 | Bassi et al. |
| 2017/0166748 A1 | 6/2017 | Luo et al. |
| 2017/0267905 A1* | 9/2017 | Nakamura ............. C09K 3/16 |
| 2018/0086914 A1 | 3/2018 | Kim |
| 2018/0258241 A1* | 9/2018 | Zia ..................... A61M 15/0001 |
| 2018/0291200 A1* | 10/2018 | Takamura ............. C08L 25/10 |
| 2018/0319979 A1* | 11/2018 | Kim ................... C08L 69/00 |
| 2018/0334534 A1 | 11/2018 | Matsubara et al. |
| 2019/0161612 A1 | 5/2019 | Kim |

FOREIGN PATENT DOCUMENTS

| | | |
|---|---|---|
| EP | 0 790 334 A1 | 8/1997 |
| EP | 1 052 272 A2 | 11/2000 |
| EP | 1 116 769 A2 | 7/2001 |
| EP | 1 116 769 A3 | 7/2001 |
| EP | 1 382 437 A2 | 1/2004 |
| EP | 1 382 437 A3 | 1/2004 |
| EP | 1 642 934 A1 | 4/2006 |
| EP | 1 699 228 A1 | 9/2006 |
| EP | 2 589 637 A1 | 5/2013 |
| JP | H 0481451 A | 3/1992 |
| JP | H 05140282 A | 6/1993 |
| JP | H 0718162 A | 1/1995 |
| JP | H 09143347 A | 6/1997 |
| JP | H 09297256 A | 11/1997 |
| JP | H 1160927 A | 3/1999 |
| JP | H 1180517 A | 3/1999 |
| JP | H 1180518 A | 3/1999 |
| JP | H 11147999 A | 6/1999 |
| JP | H 11199787 A | 7/1999 |
| JP | 2000080289 A | 3/2000 |
| JP | 2000273292 A | 10/2000 |
| JP | 2000273320 A | 10/2000 |
| JP | 2000281885 A | 10/2000 |
| JP | 3111471 B | 11/2000 |
| JP | 2003192878 A | 7/2003 |
| JP | 2004182895 A | 7/2004 |
| JP | 2004263162 A | 9/2004 |
| JP | 2005187696 A | 7/2005 |
| JP | 2007138143 A | 6/2007 |

(56) References Cited

FOREIGN PATENT DOCUMENTS

| | | | |
|---|---|---|---|
| JP | 2007254716 A | 10/2007 |
| JP | 2007254717 A | 10/2007 |
| JP | 2008075079 A | 4/2008 |
| JP | 2008214573 A | 9/2008 |
| JP | 2009155436 A | 7/2009 |
| JP | 2009155459 A | 7/2009 |
| JP | 2009197092 A | 9/2009 |
| JP | 2009242455 A | 10/2009 |
| JP | 2010024260 A | 2/2010 |
| JP | 2010209218 A | 9/2010 |
| JP | 4600015 B | 12/2010 |
| JP | 4600016 B | 12/2010 |
| JP | 2011016902 A | 1/2011 |
| JP | 4625304 B | 2/2011 |
| JP | 4631272 B | 2/2011 |
| JP | 2011137064 A | 7/2011 |
| JP | 2011161871 A | 8/2011 |
| JP | 2011195721 A | 10/2011 |
| JP | 2012021147 A | 2/2012 |
| JP | 2012229345 A | 11/2012 |
| JP | 5124932 B | 1/2013 |
| JP | 5132890 B | 1/2013 |
| JP | 5136324 B | 2/2013 |
| JP | 5172279 B | 3/2013 |
| JP | 5396810 B | 1/2014 |
| JP | 5541330 B | 7/2014 |
| JP | 201521110 A | 2/2015 |
| JP | 2017082158 A | 5/2017 |
| JP | 6164945 B | 7/2017 |
| JP | 6174406 B | 8/2017 |
| KR | 20120059382 A | 6/2012 |
| KR | 20120136434 A | 12/2012 |
| KR | 20130047456 A | 5/2013 |
| TW | 201736507 A | 10/2017 |
| WO | WO 95/15360 A1 | 6/1995 |
| WO | WO 2004/058851 A1 | 7/2004 |
| WO | WO 2005/063889 A1 | 7/2005 |
| WO | WO 2006/104701 A1 | 10/2006 |
| WO | WO 2006/126861 A1 | 11/2006 |
| WO | WO 2009/005317 A2 | 1/2009 |
| WO | WO 2009/005317 A3 | 1/2009 |
| WO | WO 2010/013578 A1 | 2/2010 |
| WO | WO 2010/050327 A1 | 5/2010 |
| WO | WO 2012/021146 A1 | 2/2012 |
| WO | WO 2012/111408 A1 | 8/2012 |
| WO | WO 2013/032970 A1 | 3/2013 |
| WO | WO 2013/066003 A1 | 5/2013 |
| WO | WO 2013/074469 A1 | 5/2013 |
| WO | WO 2013/074475 A1 | 5/2013 |
| WO | WO 2013/087842 A1 | 6/2013 |
| WO | WO 2013/129338 A1 | 9/2013 |
| WO | WO 2014/062536 A1 | 4/2014 |
| WO | WO 2014/087842 A1 | 6/2014 |
| WO | WO 2014/143177 A1 | 9/2014 |
| WO | WO 2015/083759 A1 | 6/2015 |
| WO | WO 2017/038421 A1 | 3/2017 |
| WO | WO 2017/110424 A1 | 6/2017 |
| WO | WO 2017/110646 A1 | 6/2017 |
| WO | WO 2017/110866 A1 | 6/2017 |
| WO | WO 2017/110867 A1 | 6/2017 |
| WO | WO 2018/012371 A1 | 1/2018 |
| WO | WO 2018/051480 A1 | 3/2018 |
| WO | WO 2018/051980 A1 | 3/2018 |
| WO | WO 2018/066416 A1 | 4/2018 |
| WO | WO 2018/066417 A1 | 4/2018 |
| WO | WO 2019/109595 A1 | 6/2019 |

\* cited by examiner ately, however, the highly oriented structure also makes liquid crystalline polymers susceptible to wear. Namely, one or more skin layers of the polymer tend to be peeled off from the part during use, which can lead to a poor appearance and/or performance.

As such, a need exists for a polymer composition that can be readily employed in camera modules.

SUMMARY OF THE INVENTION

In accordance with one embodiment of the present invention, a polymer composition is disclosed that comprises at least one aromatic polymer (e.g., thermotropic liquid crystalline polymer) and a tribological formulation in an amount from about 1 to about 20 parts by weight per 100 parts by weight of the aromatic polymer. The tribological formulation contains a fluorinated additive and a siloxane polymer having a weight average molecular weight of about 100,000 grams per mole or more. The weight ratio of the fluorinated additive to the siloxane polymer is from about 0.5 to about 12.

In accordance with yet another embodiment of the present invention, a camera module is disclosed that comprises a base on which is mounted a carrier assembly. The base, carrier assembly, or both comprise a molded part. The molded part contains a polymer composition that includes at least one thermotropic liquid crystalline polymer and a tribological formulation. The polymer composition exhibits a dynamic coefficient of friction of about 0.4 or less as determined in accordance with VDA 230-206:2007.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
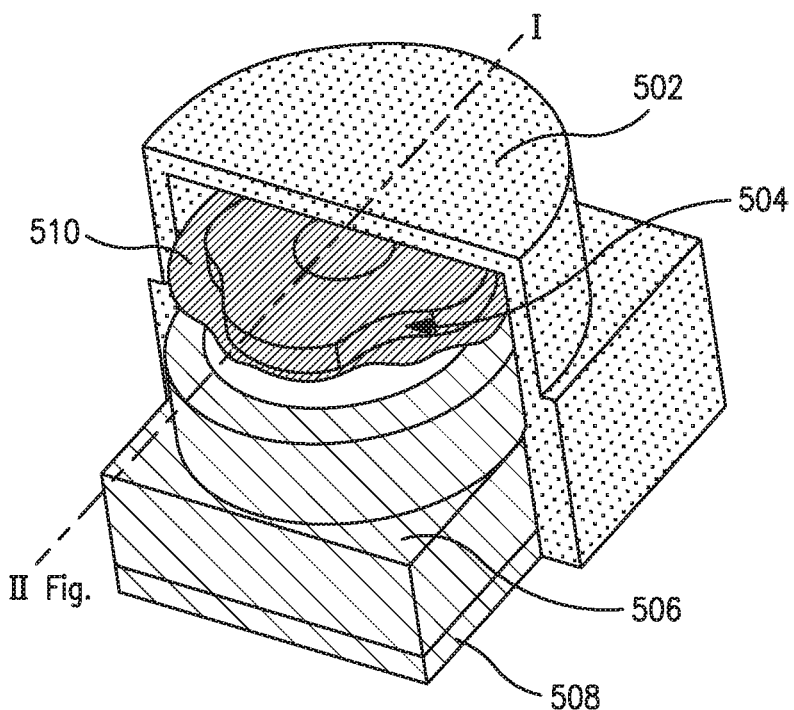
FIGS. 1-2 are perspective and front views of a compact camera module ("CCM") that may be formed in accordance with one embodiment of the present invention.

It is to be understood by one of ordinary skill in the art that the present discussion is a description of exemplary embodiments only, and is not intended as limiting the broader aspects of the present invention.

Generally speaking, the present invention is directed to a polymer composition that contains an aromatic polymer in combination with a tribological formulation. By selectively controlling the nature of these components and their relative concentration, the present inventor has discovered that the resulting polymer composition can achieve a low degree of surface friction that minimizes the extent to which a skin layer is peeled off during use of a part containing the composition (e.g., in a camera module). For example, the polymer composition may exhibit a dynamic coefficient of friction of about 1.0 or less, in some embodiments about 0.4 or less, in some embodiments about 0.35 or less, and in some embodiments, from about 0.1 to about 0.3, as determined in accordance with VDA 230-206:2007. Likewise, the wear depth may be about 500 micrometers or less, in some embodiments about 200 micrometers or less, in some embodiments about 100 micrometers or less, and in some embodiments, from about 10 to about 70 micrometers, as determined in accordance with VDA 230-206:2007.

Conventionally, it was believed that parts having such a low friction surface would not also possess sufficiently good mechanical properties. Contrary to conventional thought, however, the composition of the present invention has been found to possess excellent mechanical properties. For example, the composition may exhibit a Charpy unnotched impact strength greater than about 20 kJ/m$^2$, in some embodiments from about 25 to about 100 kJ/m$^2$, and in some embodiments, from about 30 to about 80 kJ/m$^2$, measured at 23° C. according to ISO Test No. 179-1:2010 (technically equivalent to ASTM D256-10e1). The composition may also exhibit a Charpy notched impact strength greater than about 0.5 kJ/m$^2$, in some embodiments from about 1 to about 20 kJ/m$^2$, and in some embodiments, from about 5 to about 15 kJ/m$^2$, measured at 23° C. according to ISO Test No. 179-1:2010 (technically equivalent to ASTM D256-10e1). The tensile and flexural mechanical properties are also good. For example, the composition may exhibit a tensile strength of from about 20 to about 500 MPa, in some embodiments from about 50 to about 400 MPa, and in some embodiments, from about 60 to about 350 MPa; tensile break strain of about 1% or more, in some embodiments from about 2% to about 15%, and in some embodiments, from about 3% to about 10%; and/or tensile modulus of from about 4,000 MPa to about 20,000 MPa, in some embodiments from about 5,000 MPa to about 18,000 MPa, and in some embodiments, from about 6,000 MPa to about 12,000 MPa. The tensile properties may be determined in accordance with ISO Test No. 527:2012 (technically equivalent to ASTM D638-14) at 23° C. The composition may also exhibit a flexural strength of from about 20 to about 500 MPa, in some embodiments from about 50 to about 400 MPa, and in some embodiments, from about 80 to about 350 MPa and/or a flexural modulus of from about 4,000 MPa to about 20,000 MPa, in some embodiments from about 5,000 MPa to about 18,000 MPa, and in some embodiments, from about 6,000 MPa to about 15,000 MPa. The flexural properties may be determined in accordance with ISO Test No. 178:2010 (technically equivalent to ASTM D790-10) at 23° C. The molded part may also exhibit a deflection temperature under load (DTUL) of about 180° C. or more, and in some embodiments, from about 190° C. to about 280° C., as measured according to ASTM D648-07 (technically equivalent to ISO Test No. 75-2:2013) at a specified load of 1.8 MPa. The Rockwell hardness of the part may also be about 25 or more, some embodiments about 30 or more, and in some embodiments, from about 35 to about 80, as determined in accordance with ASTM D785-08 (Scale M).

In addition, the composition can also exhibit excellent antistatic behavior, particularly when an antistatic filler is included within the polymer composition as discussed above. Such antistatic behavior can be characterized by a relatively low surface and/or volume resistivity as determined in accordance with IEC 60093. For example, the composition may exhibit a surface resistivity of about $1\times10^{15}$ ohms or less, in some embodiments about $1\times10^{14}$ ohms or less, in some embodiments from about $1\times10^{10}$ ohms to about $9\times10^{13}$ ohms, and in some embodiments, from about $1\times10^{11}$ to about $1\times10^{13}$ ohms. Likewise, the molded part may also exhibit a volume resistivity of about $1\times10^{15}$ ohm-m or less, in some embodiments from about $1\times10^{9}$ ohm-m to about $9\times10^{14}$ ohm-m, and in some embodiments, from about $1\times10^{10}$ to about $5\times10^{14}$ ohm-m. Of course, such antistatic behavior is by no means required. For example, in some embodiments, the composition may exhibit a relatively high surface resistivity, such as about $1\times10^{15}$ ohms or more, in some embodiments about $1\times10^{16}$ ohms or more, in some embodiments from about $1\times10^{17}$ ohms to about $9\times10^{30}$ ohms, and in some embodiments, from about $1\times10^{18}$ to about $1\times10^{26}$ ohms.

Various embodiments of the present invention will now be described in more detail.

I. Polymer Composition

A. Aromatic Polymer

Aromatic polymers typically constitute from about 20 wt. % to about 70 wt. %, in some embodiments from about 30 wt. % to about 65 wt. %, and in some embodiments, from about 40 wt. % to about 60 wt. % of the polymer composition. The aromatic polymers are generally considered "high performance" polymers in that they have a relatively high glass transition temperature and/or high melting temperature depending on the particular nature of the polymer. Such high performance polymers can thus provide a substantial degree of heat resistance to the resulting polymer composition. For example, the aromatic polymer may have a glass transition temperature of about 100° C. or more, in some embodiments about 120° C. or more, in some embodiments from about 140° C. to about 350° C., and in some embodiments, from about 150° C. to about 320° C. The aromatic polymer may also have a melting temperature of about 200° C. or more, in some embodiments from about 220° C. to about 400° C., and in some embodiments, from about 240° C. to about 380° C. The glass transition and melting temperatures may be determined as is well known in the art using differential scanning calorimetry ("DSC"), such as determined by ISO Test No. 11357-2:2013 (glass transition) and 11357-3:2011 (melting).

The aromatic polymer can be substantially amorphous, semi-crystalline, or crystalline in nature. One example of a suitable semi-crystalline aromatic polymer, for instance, is an aromatic polyamide. Particularly suitable aromatic polyamides are those having a relatively high melting temperature, such as about 200° C. or more, in some embodiments about 220° C. or more, and in some embodiments, from about 240° C. to about 320° C., as determined using differential scanning calorimetry according to ISO Test No. 11357. The glass transition temperature of aromatic polyamides is likewise generally from about 110° C. to about 160° C.

Aromatic polyamides typically contain repeating units held together by amide linkages (NH—CO) and are synthesized through the polycondensation of dicarboxylic acids (e.g., aromatic dicarboxylic acids), diamines (e.g., aliphatic diamines), etc. For example, the aromatic polyamide may contain aromatic repeating units derived from an aromatic dicarboxylic acid, such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4, 4'-dicarboxylic acid, diphenylsulfone-4,4'-dicarboxylic acid, 4,4'-biphenyldicarboxylic acid, etc., as well as combinations thereof. Terephthalic acid is particularly suitable. Of course, it should also be understood that other types of acid units may also be employed, such as aliphatic dicarboxylic acid units, polyfunctional carboxylic acid units, etc. The aromatic polyamide may also contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Repeating units derived from 1,9-nonanediamine and/or 2-methyl-1,8-octanediamine are particularly suitable. Of course, other diamine units may also be employed, such as alicyclic diamines, aromatic diamines, etc.

Particularly suitable polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA10T/11), poly(decamethylene terephthalamide/12-aminododecanamide) (PA10T/12), poly(decamethylene terephthalamide/decamethylene decanediamide) (PA10T/1010), poly(decamethylene terephthalamide/decamethylene dodecanediamide) (PA10T/1012), poly(decamethylene terephlhalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene Ierephthalamide/dodecamelhylene dodecanediarnide) (PA12T/1212), poly(dodecamethylene terephthalamide/caprolactam) (PA12T/6), poly(dodecamethylene terephthalamide/hexamethylene hexanediamide) (PA12T/66), and so forth. Yet other examples of suitable aromatic polyamides are described in U.S. Pat. No. 8,324,307 to Harder, et al.

Another suitable semi-crystalline aromatic polymer that may be employed in the present invention is a polyaryletherketone. Polyaryletherketones are semi-crystalline polymers with a relatively high melting temperature, such as from about 300° C. to about 400° C., in some embodiments from about 310° C. to about 390° C., and in some embodiments, from about 330° C. to about 380° C. The glass transition temperature may likewise be from about 110° C. to about 200° C. Particularly suitable polyaryletherketones are those that primarily include phenyl moieties in conjunction with ketone and/or ether moieties. Examples of such polymers include polyetheretherketone ("PEEK"), polyetherketone ("PEK"), polyetherketoneketone ("PEKK"), polyetherketoneetherketoneketone ("PEKEKK"), polyetheretherketoneketone ("PEEKK"), polyether-diphenyl-ether-ether-diphenyl-ether-phenyl-ketone-phenyl, etc., as well as blends and copolymers thereof.

As indicated above, substantially amorphous polymers may also be employed in the polymer composition that lack a distinct melting point temperature. Suitable amorphous polymers may include, for instance, polyphenylene oxide ("PPO"), aromatic polycarbonates, aromatic polyetherimides, etc. Aromatic polycarbonates, for instance, typically have a glass transition temperature of from about 130° C. to about 160° C. and contain aromatic repeating units derived from one or more aromatic diols. Particularly suitable aromatic diols are bisphenols, such as gem-bisphenols in which two phenols groups are attached to a single carbon atom of a bivalent connecting radical. Examples of such bisphenols may include, for instance, such as 4,4'-isopropylidenediphenol ("bisphenol A"), 4,4'-ethylidenediphenol, 4,4'-(4-chloro-a-methylbenzylidene)diphenol, 4,4'cyclohexylidenediphenol, 4,4 (cyclohexylmethylene)diphenol, etc., as well as combinations thereof. The aromatic diol may be reacted with a phosgene. For example, the phosgene may be a carbonyl chloride having the formula $C(O)Cl_2$. An alternative route to the synthesis of an aromatic polycarbonate may involve the transesterification of the aromatic diol (e.g., bisphenol) with a diphenyl carbonate.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). The polymers have a relatively high melting temperature, such as from about 250° C. to about 400° C., in some embodiments from about 280° C. to about 390° C., and in some embodiments, from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

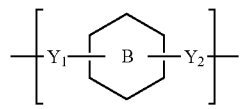

(I)

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer.

Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments, from about 45 mol. % to about 70% of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35% of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments, from about 5 mol. % to about 20% of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments from about 3 mol. % to about 25 mol. % when employed.

B. Tribological Formulation

A tribological formulation is also employed in the polymer composition, typically in an amount of from about 1 to about 30 parts, in some embodiments from about 2 to about 15 parts, and in some embodiments, from about 4 to about 12 parts per 100 parts of aromatic polymer(s) employed in the polymer composition. For example, the tribological formulation may constitute from about 1 wt. % to about 30 wt. %, in some embodiments from about 2 wt. % to about 25 wt. %, and in some embodiments, from about 4 wt. % to about 10 wt. % of the polymer composition.

The tribological formulation generally contains a siloxane polymer that improves internal lubrication and that also helps to bolster the wear and friction properties of the composition encountering another surface. Such siloxane polymers typically constitute from about 0.1 to about 20 parts, in some embodiments from about 0.4 to about 10 parts, and in some embodiments, from about 0.5 to about 5 parts per 100 parts of aromatic polymer(s) employed in the composition. Any of a variety of siloxane polymers may generally be employed in the tribological formulation. The siloxane polymer may, for instance, encompass any polymer, co-polymer or oligomer that includes siloxane units in the backbone having the formula:

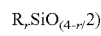

wherein
R is independently hydrogen or substituted or unsubstituted hydrocarbon radicals, and
r is 0, 1, 2 or 3.

Some examples of suitable radicals R include, for instance, alkyl, aryl, alkylaryl, alkenyl or alkynyl, or cycloalkyl groups, optionally substituted, and which may be interrupted by heteroatoms, i.e., may contain heteroatom(s) in the carbon chains or rings. Suitable alkyl radicals, may include, for instance, methyl, ethyl, n-propyl, isopropyl, n-butyl, isobutyl, tert-butyl, n-pentyl, isopentyl, neopentyl and tert-pentyl radicals, hexyl radicals (e.g., n-hexyl), heptyl radicals (e.g., n-heptyl), octyl radicals (e.g., n-octyl), isooctyl radicals (e.g., 2,2,4-trimethylpentyl radical), nonyl radicals (e.g., n-nonyl), decyl radicals (e.g., n-decyl), dodecyl radicals (e.g., n-dodecyl), octadecyl radicals (e.g., n-octadecyl), and so forth. Likewise, suitable cycloalkyl radicals may include cyclopentyl, cyclohexyl cycloheptyl radicals, methylcyclohexyl radicals, and so forth; suitable aryl radicals may include phenyl, biphenyl, naphthyl, anthryl, and phenanthryl radicals; suitable alkylaryl radicals may include o-, m- or p-tolyl radicals, xylyl radicals, ethylphenyl radicals, and so forth; and suitable alkenyl or alkynyl radicals may include vinyl, 1-propenyl, 1-butenyl, 1-pentenyl, 5-hexenyl, butadienyl, hexadienyl, cyclopentenyl, cyclopentadienyl, cyclohexenyl, ethynyl, propargyl 1-propynyl, and so forth. Examples of substituted hydrocarbon radicals are halogenated alkyl radicals (e.g., 3-chloropropyl, 3,3,3-trifluoropropyl, and perfluorohexylethyl) and halogenated aryl radicals (e.g., p-chlorophenyl and p-chlorobenzyl). In one particular embodiment, the siloxane polymer includes alkyl radicals (e.g., methyl radicals) bonded to at least 70 mol % of the Si atoms and optionally vinyl and/or phenyl radicals bonded to from 0.001 to 30 mol % of the Si atoms. The siloxane polymer is also preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxy groups or alkoxy groups, such as methoxy or ethoxy radicals. Particularly suitable examples of the siloxane polymer include, for instance, dimethylpolysiloxane, phenylmethylpolysiloxane, vinylmethylpolysiloxane, and trifluoropropylpolysiloxane.

The siloxane polymer may also include a reactive functionality on at least a portion of the siloxane monomer units of the polymer, such as one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoxime groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), am inoxy groups (e.g., dimethylaminoxy and diethylaminoxy), mercapto groups, etc.

Regardless of its particular structure, the siloxane polymer typically has a relatively high molecular weight, which reduces the likelihood that it migrates or diffuses to the surface of the polymer composition and thus further minimizes the likelihood of phase separation. For instance, the siloxane polymer typically has a weight average molecular weight of about 100,000 grams per mole or more, in some embodiments about 200,000 grams per mole or more, and in some embodiments, from about 500,000 grams per mole to about 2,000,000 grams per mole. The siloxane polymer may also have a relative high kinematic viscosity, such as about 10,000 centistokes or more, in some embodiments about 30,000 centistokes or more, and in some embodiments, from about 50,000 to about 500,000 centistokes.

If desired, silica particles (e.g., fumed silica) may also be employed in combination with the siloxane polymer to help improve its ability to be dispersed within the composition. Such silica particles may, for instance, have a particle size of from about 5 nanometers to about 50 nanometers, a surface area of from about 50 square meters per gram ($m^2/g$) to about 600 $m^2/g$, and/or a density of from about 160 kilogram per cubic meter ($kg/m^3$) to about 190 $kg/m^3$. When employed, the silica particles typically constitute from about 1 to about 100 parts, and in some some embodiments, from about 20 to about 60 parts by weight based on 100 parts by weight of the siloxane polymer. In one embodiment, the silica particles can be combined with the siloxane polymer prior to addition of this mixture to the polymer composition. For instance a mixture including an ultrahigh molecular weight polydimethylsiloxane and fumed silica can be incorporated in the polymer composition. Such a pre-formed mixture is available as Genioplast® Pellet S from Wacker Chemie, AG.

The tribological formulation may also contain other components that can help the resulting polymer composition to achieve a good combination of low friction and good wear resistance. In one embodiment, for instance, the tribological formulation may employ a fluorinated additive in combination with the siloxane polymer. Without intending to be limited by theory, it is believed that the fluorinated additive can, among other things, improve the processing of the composition, such as by providing better mold filling, internal lubrication, mold release, etc. When employed, the weight ratio of the fluorinated additive to the siloxane polymer is typically from about 0.5 to about 12, in some embodiments from about 0.8 to about 10, and in some embodiments, from about 1 to about 6. For example, the fluorinated additive may constitute from about 0.1 to about 20 parts, in some embodiments from about 0.5 to about 15 parts, and in some embodiments, from about 1 to about 10 parts per 100 parts of aromatic polymer(s) employed in the composition.

In certain embodiments, the fluorinated additive may include a fluoropolymer, which contains a hydrocarbon backbone polymer in which some or all of the hydrogen atoms are substituted with fluorine atoms. The backbone polymer may polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene, vinylidene fluoride, hexafluoropropylene, chlorotrifluoroethylene, perfluoroethylvinyl ether, perfluoromethylvinyl ether, perfluoropropylvinyl ether, etc., as well as mixtures thereof. Specific examples of suitable fluoropolymers include polytetrafluoroethylene, perfluoroalkylvinyl ether, poly(tetrafluoroethylene-co-perfluoroalkyvinylether), fluorinated ethylene-propylene copolymer, ethylene-tetrafluoroethylene copolymer, polyvinylidene fluoride, polychlorotrifluoroethylene, etc., as well as mixtures thereof.

The fluorinated additive may contain only the fluoropolymer, or it may also include other ingredients, such as those that aid in its ability to be uniformly dispersed within the polymer composition. In one embodiment, for example, the fluorinated additive may include a fluoropolymer in combination with a plurality of carrier particles. In such embodiments, for instance, the fluoropolymer may be coated onto the carrier particles. Silicate particles are particularly suitable for this purpose, such as talc ($Mg_3Si_4O_{10}(OH)_2$), halloysite ($Al_2Si_2O_5(OH)_4$), kaolinite ($Al_2Si_2O_5(OH)_4$), illite (($K, H_3O)(Al, Mg, Fe)_2 (Si,Al)_4O_{10}[(OH)_2, (H_2O)]$), montmorillonite ($Na, Ca)_{0.33}(Al, Mg)_2Si_4O_{10}(OH)_2.nH_2O$), vermiculite (($MgFe, Al)_3(Al, Si)_4O_{10}(OH)_2.4H_2O$), palygorskite (($Mg, Al)_2Si_4O_{10}(OH).4(H_2O)$), pyrophyllite ($Al_2Si_4O_{10}(OH)_2$), calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K, Na)(Al, Mg, Fe)_2(Si, Al)_4O_{10}(OH)_2$), etc., as well as combinations thereof. The carrier particles may have an average particle size of from about 5 to about 50 micrometers, and in some embodiments, from about 10 to 20 micrometers. If desired, the carrier particles may also be in the shape of plate-like particles in that the ratio of its major axis to thickness is 2 or more.

C. Other Optional Components i. Inorganic Filler

If desired, an inorganic filler may be employed for improving certain properties of the polymer composition. For example, the present inventor has discovered that the use of inorganic fillers with a certain hardness value can improve the mechanical strength, adhesive strength, and surface smoothness of a part containing the composition. The resulting polymer composition may also be able to achieve less delamination of the polymer skin layer, which enables it to be uniquely suited for very small parts. The inorganic filler may be employed in the polymer composition in an amount of from about 10 to about 95 parts, in some embodiments from about 20 to about 90 parts, and in some embodiments, from about 50 to about 85 parts by weight per 100 parts of the aromatic polymer(s) employed in the polymer composition. For instance, the inorganic filler may constitute from about 10 wt. % to about 70 wt. %, in some embodiments from about 20 wt. % to about 60 wt. %, and in some embodiments, from about 30 wt. % to about 60 wt. % of the polymer composition.

The nature of the inorganic filler may vary, such as particles, fibers, etc. In certain embodiments, for instance, inorganic filler particles may be employed having a certain hardness value to help improve the surface properties of the composition. For instance, the hardness values may be about 2.5 or more, in some embodiments about 3.0 or more, in some embodiments from about 3.0 to about 11.0, in some embodiments from about 3.5 to about 11.0, and in some embodiments, from about 4.5 to about 6.5 based on the Mohs hardness scale. Examples of such particles may include, for instance, carbonates, such as calcium carbonate ($CaCO_3$, Mohs hardness of 3.0) or a copper carbonate hydroxide ($Cu_2CO_3(OH)_2$, Mohs hardness of 4.0); fluorides, such as calcium fluoride ($CaFl_2$, Mohs hardness of 4.0); phosphates, such as calcium pyrophosphate (($Ca_2P_2O_7$, Mohs hardness of 5.0), anhydrous dicalcium phosphate ($CaHPO_4$, Mohs hardness of 3.5), or hydrated aluminum phosphate ($AlPO_4.2H_2O$, Mohs hardness of 4.5); silicates, such as silica ($SiO_2$, Mohs hardness of 6.0), potassium aluminum silicate ($KAlSi_3O_8$, Mohs hardness of 6), or copper silicate ($CuSiO_3.H_2O$, Mohs hardness of 5.0); borates, such as calcium borosilicate hydroxide ($Ca_2B_5SiO_9$(OH)$_5$, Mohs hardness of 3.5); alumina ($AlO_2$, Mohs hardness of 10.0); sulfates, such as calcium sulfate ($CaSO_4$, Mohs hardness of 3.5) or barium sulfate ($BaSO_4$, Mohs hardness of from 3 to 3.5); and so forth, as well as combinations thereof. When employed, the inorganic particles typically have a median size (e.g., diameter) of from about 0.1 to about 35 micrometers, in some embodiments from about 2 to about 20 micrometers, in some embodiments from about 3 to about 15 micrometers, and in some embodiments, from about 7 to about 12 micrometers, such as determined using laser diffraction techniques in accordance with ISO 13320:2009 (e.g., with a Horiba LA-960 particle size distribution analyzer). The filler inorganic particles may also have a narrow size distribution. That is, at least about 70% by volume of the particles, in some embodiments at least about 80% by volume of the particles, and in some embodiments, at least about 90% by volume of the particles may have a size within the ranges noted above.

The inorganic filler may also be fibers derived from a material having the desired hardness value. Particularly suitable fibers for this purpose include those derived from minerals, including silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum)); mineral wools (e.g., rock or slag wool); and so forth. Particularly suitable are fibers derived from inosilicates, such as wollastonite (Mohs hardness of 4.5 to 5.0), which are commercially available from Nyco Minerals under the trade designation NYGLOS® (e.g., NYGLOS® 4W or NYGLOS® 8).

When employed, the mineral fibers may have a median width (e.g., diameter) of from about 0.1 to about 35 micrometers, in some embodiments from about 2 to about 20 micrometers, in some embodiments from about 3 to about 15 micrometers, and in some embodiments, from about 7 to about 12 micrometers, such as determined using laser diffraction techniques in accordance with ISO 13320:2009 (e.g., with a Horiba LA-960 particle size distribution analyzer). The mineral fibers may also have a narrow size distribution. That is, at least about 70% by volume of the fibers, in some embodiments at least about 80% by volume of the fibers, and in some embodiments, at least about 90% by volume of the fibers may have a size within the ranges noted above. The mineral fibers may also have an aspect ratio of from about 1 to about 50, in some embodiments from about 2 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

ii. Impact Modifier

If desired, an impact modifier may also be employed in the polymer composition to help improve the impact strength and flexibility of the polymer composition. In fact, the present inventor has discovered that the impact modifier can actually make the surface of a molded part smoother and minimize the likelihood that a skin layer is peeled therefrom during use. When employed, the impact modifier typically constitutes from about 0.1 to about 20 parts, in some embodiments from about 0.2 to about 10 parts, and in some embodiments, from about 0.5 to about 5 parts by weight per 100 parts of the aromatic polymer(s) employed in the polymer composition. For instance, the impact modifier may constitute from about 0.1 wt. % to about 10 wt. %, in some embodiments from about 0.2 wt. % to about 8 wt. %, and in some embodiments, from about 0.5 wt. % to about 4 wt. % of the polymer composition.

One particularly suitable type of impact modifier may include, for instance, an olefin copolymer that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

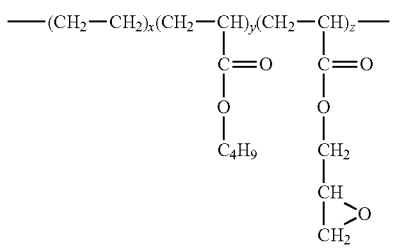

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and has a glycidyl methacrylate monomer content of 8 wt. %. Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

iii. Antistatic Filler

An antistatic filler may also be employed in the polymer composition to help reduce the tendency to create a static electric charge during a molding operation, transportation, collection, assembly, etc. Such fillers, when employed, typically constitute from about 0.1 to about 20 parts, in some embodiments from about 0.2 to about 10 parts, and in some embodiments, from about 0.5 to about 5 parts by weight per 100 parts of the aromatic polymer(s) employed in the polymer composition. For instance, the antistatic filler may constitute from about 0.1 wt. % to about 10 wt. %, in some embodiments from about 0.2 wt. % to about 8 wt. %, and in some embodiments, from about 0.5 wt. % to about 4 wt. % of the polymer composition.

Any of a variety of antistatic fillers may generally be employed in the polymer composition to help improve its antistatic characteristics. Examples of suitable antistatic fillers may include, for instance, metal particles (e.g., aluminum flakes), metal fibers, carbon particles (e.g., graphite, expanded graphite, grapheme, carbon black, graphitized carbon black, etc.), carbon nanotubes, carbon fibers, and so forth. Carbon fibers and carbon particles (e.g., graphite) are particularly suitable. When employed, suitable carbon fibers may include pitch-based carbon (e.g., tar pitch), polyacrylonitrile-based carbon, metal-coated carbon, etc. Desirably, the carbon fibers have a high purity in that they possess a relatively high carbon content, such as a carbon content of about 85 wt. % or more, in some embodiments about 90 wt. % or more, and in some embodiments, about 93 wt. % or more. For instance, the carbon content can be at least about 94% wt., such as at least about 95% wt., such as at least about 96% wt., such at least about 97% wt., such as even at least about 98% wt. The carbon purity is generally less than 100 wt. %, such as less than about 99 wt. %. The density of the carbon fibers is typically from about 0.5 to about 3.0 g/cm³, in some embodiments from about 1.0 to about 2.5 g/cm³, and in some embodiments, from about 1.5 to about 2.0 g/cm³.

In one embodiment, the carbon fibers are incorporated into the matrix with minimal fiber breakage. The volume average length of the fibers after molding can generally be from about 0.1 mm to about 1 mm even when using a fiber having an initial length of about 3 mm. The average length and distribution of the carbon fibers can also be selectively controlled in the final polymer composition to achieve a better connection and electrical pathway within the liquid crystalline polymer matrix. The average diameter of the fibers can be from about 0.5 to about 30 micrometers, in some embodiments from about 1 to about 20 micrometers, and in some embodiments, from about 3 to about 15 micrometers.

To improve dispersion within the polymer matrix, the carbon fibers may be at least partially coated with a sizing agent that increases the compatibility of the carbon fibers with the liquid crystalline polymer. The sizing agent may be stable so that it does not thermally degrade at temperatures at which the liquid crystalline polymer is molded. In one embodiment, the sizing agent may include a polymer, such as an aromatic polymer. For instance, the aromatic polymer may have a thermal decomposition temperature of greater than about 300° C., such as greater than about 350° C., such as greater than about 400° C. As used herein, the thermal decomposition temperature of a material is the temperature at which the material losses 5% of its mass during thermogravimeteric analysis as determined in accordance with ASTM Test E 1131 (or ISO Test 11358). The sizing agent can also have a relatively high glass transition temperature. For instance, the glass transition temperature of the sizing agent can be greater than about 300° C., such as greater than about 350° C., such as greater than about 400° C. Particular examples of sizing agents include polyimide polymers, aromatic polyester polymers including wholly aromatic polyester polymers, and high temperature epoxy polymers. In one embodiment, the sizing agent may include a liquid crystalline polymer. The sizing agent can be present on the fibers in an amount of at least about 0.1% wt., such as in an amount of at least 0.2% wt., such as in an amount of at least about 0.1% wt. The sizing agent is generally present in an amount less than about 5% wt., such as in an amount of less than about 3% wt.

Another suitable antistatic filler is an ionic liquid. One benefit of such a material is that, in addition to being an antistatic agent, the ionic liquid can also exist in liquid form during melt processing, which allows it to be more uniformly blended within the polymer matrix. This improves electrical connectivity and thereby enhances the ability of the composition to rapidly dissipate static electric charges from its surface.

The ionic liquid is generally a salt that has a low enough melting temperature so that it can be in the form of a liquid when melt processed with the liquid crystalline polymer. For example, the melting temperature of the ionic liquid may be about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, quaternary oniums having the following structures:

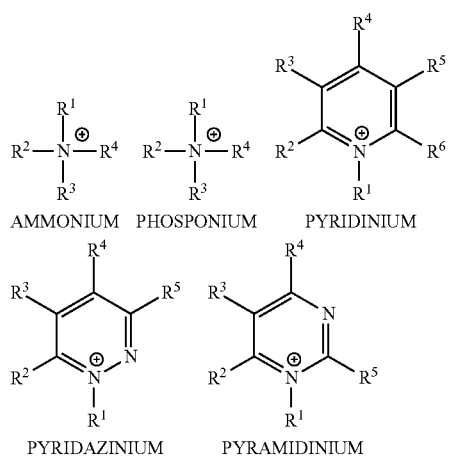

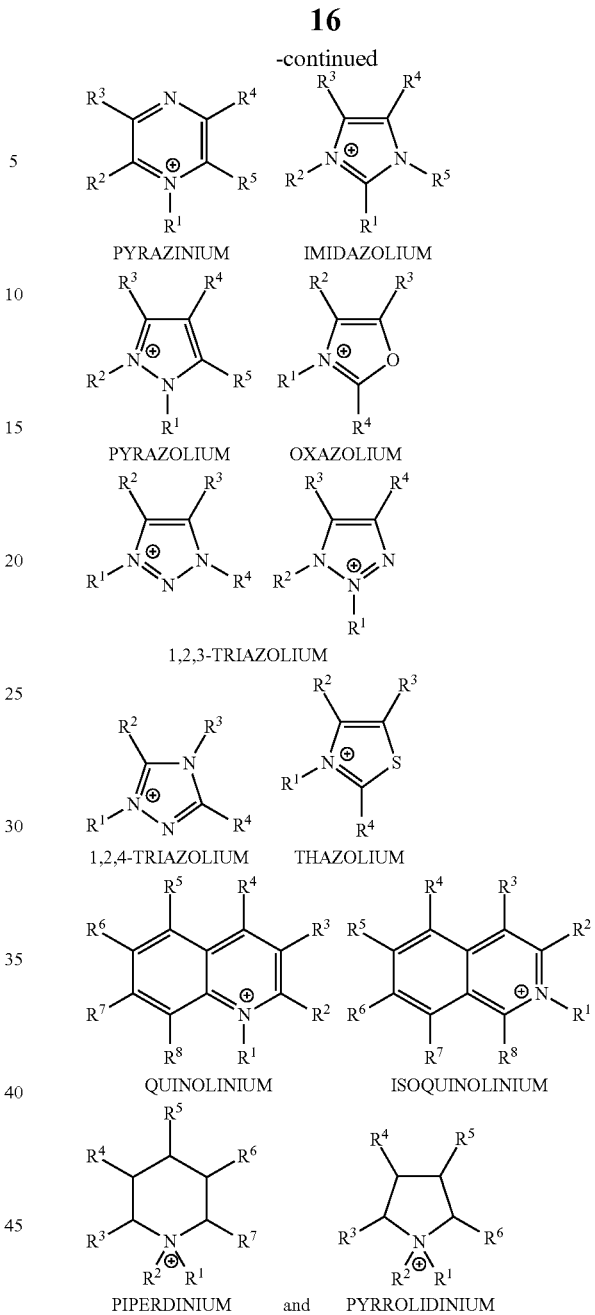

wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted $C_1$-$C_{10}$ alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted $C_1$-$C_{10}$ alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one particular embodiment, for example, the cationic species may be an ammonium compound having the structure $N^+R^1R^2R^3R^4$, wherein $R^1$, $R^2$, and/or $R^3$ are independently a $C_1$-$C_6$ alkyl (e.g., methyl, ethyl, butyl, etc.) and $R^4$ is hydrogen or a $C_1$-$C_4$ alkyl group (e.g., methyl or ethyl). For example, the cationic component may be tri-butylmethylammonium, wherein $R^1$, $R^2$, and $R^3$ are butyl and $R^4$ is methyl.

Suitable counterions for the cationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); alum inates (e.g., tetrachloroaluminate); fatty acid carboxylates (e.g., oleate, isostearate, pentadecafluorooctanoate, etc.); cyanates; acetates; and so forth, as well as combinations of any of the foregoing. To help improve compatibility with the liquid crystalline polymer, it may be desired to select a counterion that is generally hydrophobic in nature, such as imides, fatty acid carboxylates, etc. Particularly suitable hydrophobic counterions may include, for instance, bis(pentafluoroethylsulfonyl)imide, bis(trifluoromethylsulfonyl)imide, and bis(trifluoromethyl)imide.

iv. Other Additives

A wide variety of additional additives can also be included in the polymer composition, such as lubricants, thermally conductive fillers, pigments, antioxidants, stabilizers, surfactants, waxes, flame retardants, anti-drip additives, and other materials added to enhance properties and processability. Lubricants, for example, may be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

Of course, one beneficial aspect of the present invention is that good mechanical properties may be achieved without adversely impacting the dimensional stability of the resulting part. To help ensure that this dimensional stability is maintained, it is generally desirable that the polymer composition remains substantially free of conventional fibrous fillers, such as glass fibers. Thus, if employed at all, such fibers typically constitute no more than about 10 wt. %, in some embodiments no more than about 5 wt. %, and in some embodiments, from about 0.001 wt. % to about 3 wt. % of the polymer composition.

II. Formation

The aromatic polymer, tribological formulation, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the present inventor has discovered that the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 1 to about 200 Pa-s, in some embodiments from about 5 to about 180 Pa-s, in some embodiments from about 10 to about 150 Pa-s, and in some embodiments, from about 60 to about 120 Pa-s, determined at a shear rate of 1000 seconds$^{-1}$. Melt viscosity may be determined in accordance with ISO Test No. 11443:2005 at a temperature that is 15° C. higher than the melting temperature of the composition (e.g., 350° C.).

III. Shaped Parts

Shaped parts may be formed from the polymer composition using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Due to its high fluidity, relatively thin shaped parts (e.g., injection molded parts) can be readily formed therefrom. For example, such parts may have a thickness of about 10 millimeters or less, in some embodiments about 5 millimeters or less, and in some embodiments, from about 0.2 to about 4 millimeters (e.g., 0.3 or 3 millimeters). When forming an injection molded part, for instance, a relatively high "spiral flow length" can be achieved. The term "spiral flow length" generally refers to the length reached by the flow of the composition in a spiral flow channel when it is injected at constant injection temperature and injection pressure from a central gate of a mold in which the spiral flow channel is formed. The spiral flow length may, for instance, be about 15 millimeter or more, in some embodiments about 20 millimeters or more, in some embodiments about 22 millimeters or more, and in some embodiments, from about 25 to about 80 millimeters, as determined in accordance with ASTM D3123-09 at a barrel temperature of 230° C., molding temperature of 40° C. to 60° C., and a maximum injection pressure of 860 bar.

The polymer composition can also remain dimensionally stable when shaped into a part, and thus exhibit a relatively low degree of warpage. The degree of warpage may be characterized by low "flatness values" as determined by the test described in more detail below. More particularly, the polymer composition may exhibit a flatness value of about 1 millimeter or less, in some embodiments about 0.8 millimeters or less, and in some embodiments, from about 0.1 to about 0.7 millimeters. The composition may also maintain such a low warpage even after being conditioned at high temperatures and humidity levels (e.g., 85° C. and 85% relative humidity) for a substantial period of time (e.g., 72 hours). For example, after being conditioned at 85° C./85% relative humidity for 72 hours, the polymer composition may still exhibit a flatness value of about 2 millimeters or less, in some embodiments about 1.5 millimeters or less, and in some embodiments, from about 0.1 to about 1.2 millimeters.

A wide variety of types of parts may also be formed from the polymer composition of the present invention. For example, the polymer composition can be employed in lighting assemblies, battery systems, sensors and electronic components, portable electronic devices such as smart phones, MP3 players, mobile phones, computers, televisions, automotive parts, etc. In one particular embodiment, the polymer composition may be employed in a camera module, such as those commonly employed in wireless communication devices (e.g., cellular telephone). For example, the camera module may employ a base, carrier assembly mounted on the base, a cover mounted on the carrier assembly, etc. The base may have a thickness of about 500 micrometers or less, in some embodiments from about 10 to about 450 micrometers, and in some embodiments, from about 20 to about 400 micrometers. Likewise, the carrier assembly may have a wall thickness of about 500 micrometers or less, in some embodiments from about 10 to about 450 micrometers, and in some embodiments, from about 20 to about 400 micrometers.

Figure 2:
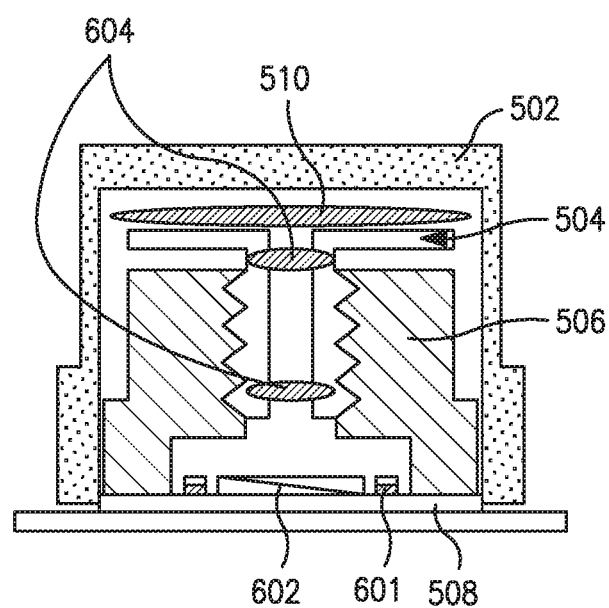

One particularly suitable camera module is shown in FIGS. 1-2. As shown, a camera module 500 contains a carrier assembly 504 that overlies a base 506. The base 506, in turn, overlies an optional main board 508. Due to their relatively thin nature, the base 506 and/or main board 508 are particularly suited to be molded from the polymer composition of the present invention. The carrier assembly 504 may have any of a variety of configurations as is known in the art. In one embodiment, for example, the carrier assembly 504 may contain a hollow barrel that houses one or more lenses 604, which are in communication with an image sensor 602 positioned on the main board 508 and controlled by a circuit 601. The barrel may have any of a variety of shapes, such as rectangular, cylindrical, etc. In certain embodiments, the barrel may be formed from the polymer composition of the present invention and have a wall thickness within the ranges noted above. It should be understood that other parts of the camera module may also be formed from the polymer composition of the present invention. For example, as shown, a cover may overly the carrier assembly 504 that includes, for example, a substrate 510 (e.g., film) and/or thermal insulating cap 502. In some embodiments, the substrate 510 and/or cap 502 may also be formed from the polymer composition.

The present invention may be better understood with reference to the following examples.

Test Methods

Friction and Wear. The degree of friction generated by a sample can be characterized by the average dynamic coefficient of friction (dimensionless) as determined according to VDA 230-206:2007 using a SSP-03 machine (Stick Slip test). Likewise, the degree of wear of a sample testing may also be determined in accordance with VDA 230-206:2007. More particularly, ball-shape specimens and plate shape specimens are prepared using a polymer product via injection molding process. The ball specimens is 0.5 inches in diameter. The plate specimen is obtained from middle part of ISO tensile bar by cutting two end areas of the tensile bars. The plate specimen is fixed on sample holder, and the ball specimen is moved in contact with the plate specimens at 150 mm/s and 15 N force. After 1000 cycles, the dynamic coefficient of friction is obtained. The depth of wear is obtained from ball specimens by measuring diameter of worn-out ball area. Based on the diameter of the worn-out area, the depth of worn-out the ball specimen is calculated and obtained.

Melt Viscosity: The melt viscosity (Pa-s) may be determined in accordance with ISO Test No. 11443:2005 at a shear rate of 1000 $s^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unotched and Notched Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Rockwell Hardness: Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

Surface/Volume Resistivity: The surface and volume resistivity values are generally determined in accordance with IEC 60093 (similar to ASTM D257-07). According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-m).

Weldline Strength: The weldline strength may be determined by first forming an injection molded compact camera module from a polymer composition sample as is well known in the art. Once formed, the compact camera module may be placed on a sample holder. The weldline of the module may be subjected to a tensile force by a rod moving at a speed of 5.08 millimeters per minute. The maximum force at break ($kg_f$) may be recorded as an estimate of the weldline strength.

Spiral Flow Length: The term "spiral flow length" generally refers to the length reached by the flow of the composition in a spiral flow channel (thickness of 0.3 mm) when it is injected at constant injection temperature and injection pressure from a central gate of a mold in which the spiral flow channel is formed. The spiral flow length may be determined in accordance with ASTM D312309 at a barrel temperature of 230° C., molding temperature of 40° C. to 60° C., and a maximum injection pressure of 860 bar.

Flatness Value: The flatness value (warpage) of an LGA connector sample may be measured using an OGP Smartscope Quest 300 Optical Measurement System. XYZ Measurements may be taken across the specimen starting with X and Y values corresponding to 5, 22.5, 50, 57.5 and 75 mm. Z values may be normalized so that the minimum Z value corresponded to a height of zero. The flatness value is calculated as the average of the 25 normalized Z values.

EXAMPLE 1

Samples 1-6 are formed from various percentages of a liquid crystalline polymer, barium sulfate, impact modifier (Lotader® 8840), tribological formulation, black color masterbatch, and antistatic filler, as indicated in Table 1 below. The tribological formulation includes a combination of a high molecular weight siloxane polymer (Genioplast® Pellet S) and a fluorinated additive (Thor FPz mica). The black color masterbatch contains 80 wt. % liquid crystalline polymer and 20 wt. % carbon black. The antistatic filler is an ionic liquid—i.e., tri-n-butylmethylammonium bis(trifluoromethanesulfonyl)-imide (FC-4400 from 3M). The liquid crystalline polymer (LCP 1) in Samples 1-4 is formed from HBA, HNA, TA, BP, and APAP, such as described in U.S. Pat. No. 5,508,374 to Lee, et al, while the liquid crystalline polymer (LCP 2) in Samples 5-6 is formed from HBA, HNA, and TA. Compounding is performed using an 18-mm single screw extruder. Parts are injection molded the samples into plaques (60 mm×60 mm).

TABLE 1

| | Sample | | | | | |
| --- | --- | --- | --- | --- | --- | --- |
| | 1 | 2 | 3 | 4 | 5 | 6 |
| LCP 1 | 41.9 | 42.9 | 43.4 | 42.4 | — | — |
| LCP 2 | — | — | — | — | 41.9 | 42.9 |
| Barium Sulfate | 40 | 40 | 40 | 40 | 40 | 40 |
| Lotader ® 8840 | 1 | 1 | 1 | 1 | 1 | 1 |
| Black Color Masterbatch | 12.5 | 12.5 | 12.5 | 12.5 | 12.5 | 12.5 |
| Thor FPz Mica | 2 | 2 | 2 | 2 | 2 | 2 |
| Genioplast ® Pellet S | 2 | 1 | 0.5 | 1.5 | 2 | 1 |
| FC-4400 | 0.6 | 0.6 | 0.6 | 0.6 | 0.6 | 0.6 |

Samples 1-3 and 5-6 and also tested for thermal, mechanical, and wear properties. The results are set forth below in Table 2.

TABLE 2

| | Sample | | | | |
|---|---|---|---|---|---|
| | 1 | 2 | 3 | 5 | 6 |
| DTUL @ 1.8 Mpa (° C.) | 213 | 209 | 210 | 190 | 193 |
| Charpy Notched (kJ/m²) | — | — | — | 8.6 | 9.3 |
| Rockwell Hardness (M-scale) | 41 | 45 | 46 | 48 | 54 |
| Tensile Strength (MPa) | 101 | 101 | 101 | 113 | 116 |
| Tensile Modulus (MPa) | 6,866 | 6,873 | 7,122 | 7,155 | 7,572 |
| Tensile Elongation (%) | 3.98 | 4.13 | 3.43 | 5.30 | 5.03 |
| Flexural Strength (MPa) | 113 | 115 | 118 | 124 | 130 |
| Flexural Modulus (MPa) | 7,331 | 7,309 | 7,588 | 7,660 | 8,045 |
| Dynamic Coefficient of Friction | 0.17 | 0.47 | 0.58 | 0.16 | 0.45 |
| Wear Depth | 2 | 157 | 326 | 2 | 152 |
| Weldline Strength (kg$_f$) | — | 4.46 | — | — | — |
| Spiral Flow Length (mm) | — | 29.6 | — | — | — |
| Warpage (mm) Before Conditioning | — | 0.7 | — | — | — |
| After Conditioning at 85° C./85% RH for 72 hrs | — | 1.1 | — | — | — |

EXAMPLE 2

Samples 7-12 are formed from various percentages of a liquid crystalline polymer, inorganic filler (barium sulfate or mica), impact modifier (Lotader® 8840), tribological formulation, and black color masterbatch, as indicated in Table 3 below. The tribological formulation includes a combination of a high molecular weight siloxane polymer (Genioplast® Pellet S) and a fluorinated additive (KT 300M PTFE). The black color masterbatch contains 80 wt. % liquid crystalline polymer and 20 wt. % carbon black. The liquid crystalline polymer (LCP 1) in Samples 10-12 is formed from HBA, HNA, TA, BP, and APAP, such as described in U.S. Pat. No. 5,508,374 to Lee, et al, while the liquid crystalline polymer (LCP 2) in Samples 7-9 is formed from HBA, HNA, and TA. Compounding is performed using an 18-mm single screw extruder. Parts are injection molded the samples into plaques (60 mm×60 mm).

TABLE 3

| | Sample | | | | | |
|---|---|---|---|---|---|---|
| | 7 | 8 | 9 | 10 | 11 | 12 |
| LCP 1 | — | — | — | 36.5 | 40.5 | 50.5 |
| LCP 2 | 36.5 | 40.5 | 50.5 | — | — | — |
| Barium Sulfate | 40 | 40 | — | 40 | 40 | — |
| Lotader ® 8840 | 4 | — | 4 | 4 | — | 4 |
| Black Color Masterbatch | 12.5 | 12.5 | 12.5 | 12.5 | 12.5 | 12.5 |
| Mica (Suzolite) | — | — | 26 | — | — | 26 |
| Genioplast ® Pellet S | 5 | 5 | 5 | 5 | 5 | 5 |
| PTFE (KT 300M) | 2 | 2 | 2 | 2 | 2 | 2 |

Samples 7-12 are also tested for thermal, mechanical, and wear properties. The results are set forth below in Table 4.

TABLE 4

| | Sample | | | | | |
|---|---|---|---|---|---|---|
| | 7 | 8 | 9 | 10 | 11 | 12 |
| MV 1000 (Pa-S) | 116 | 56 | 96 | 68 | 33 | 60 |
| Melting Temperature (° C.) | 329 | 329 | 330 | 328 | 328 | 329 |
| DTUL @ 1.8 Mpa (° C.) | 165 | 185 | 208 | 200 | 217 | 234 |
| Charpy Notched (kJ/m²) | 3.7 | 8.8 | 4.0 | 3.9 | 3.8 | 4.4 |
| Rockwell Hardness (M-scale) | 22 | 41 | 30 | 14 | 34 | 35 |
| Tensile Strength (MPa) | 70 | 103 | 76 | 83 | 93 | 75 |
| Tensile Modulus (MPa) | 5,900 | 7,725 | 9,599 | 5,687 | 7,476 | 9,133 |
| Tensile Elongation (%) | 2.43 | 3.20 | 1.53 | 3.88 | 2.18 | 1.41 |
| Flexural Strength (MPa) | 95 | 122 | 117 | 87 | 115 | 109 |
| Flexural Modulus (MPa) | 5,749 | 7,441 | 9,493 | 5,569 | 7,283 | 9,273 |
| Dynamic Coefficient of Friction | — | 0.16 | — | — | 0.17 | — |
| Wear Depth (μm) | — | 0.2 | — | — | 1 | — |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising at least one thermotropic liquid crystalline polymer and a tribological formulation in an amount from about 1 to about 20 parts by weight per 100 parts by weight of the liquid crystalline polymer, wherein the tribological formulation contains a fluorinated additive and a siloxane polymer having a weight average molecular weight of about 100,000 grams per mole or more, and further wherein the weight ratio of the fluorinated additive to the siloxane polymer is from about 0.5 to about 12.

2. The polymer composition of claim 1, wherein the liquid crystalline polymer constitutes from about 20 wt. % to about 70 wt. % of the polymer composition and the tribological formulation constitutes from about 1 wt. % to about 30 wt. % of the polymer composition.

3. The polymer composition of claim 1, wherein the siloxane polymer is present in an amount from about 0.4 to about 10 parts by weight per 100 parts by weight of the liquid crystalline polymer.

4. The polymer composition of claim 1, wherein the siloxane polymer includes siloxane units in the backbone having the formula:

$RrSiO_{(4-r/2)}$ wherein R is independently hydrogen or substituted or unsubstituted hydrocarbon radicals and r is 0, 1, 2 or 3.

5. The polymer composition of claim 4, wherein the siloxane polymer includes alkyl radicals bonded to at least 70 mol % of the Si atoms.

6. The polymer composition of claim 1, wherein the siloxane polymer includes dimethylpolysiloxane, phenylmethylpolysiloxane, vinylmethylpolysiloxane, trifluoropropylpolysiloxane, or a combination thereof.

7. The polymer composition of claim 1, wherein the siloxane polymer has a kinematic viscosity of about 10,000 centistokes or more.

8. The polymer composition of claim 1, wherein the tribological formulation further includes silica particles.

9. The polymer composition of claim 1, wherein the fluorinated additive is present in an amount of from about 0.1 to about 20 parts by weight per 100 parts by weight of the aromatic polymer.

10. The polymer composition of claim 1, wherein the fluorinated additive includes a fluoropolymer.

11. The polymer composition of claim 10, wherein the fluoropolymer includes polytetrafluoroethylene, perfluoroalkylvinyl ether, poly(tetrafluoroethylene-co-perfluoroalkyvinyl ether) fluorinated ethylene-propylene copolymer, ethylene-tetrafluoroethylene copolymer, polyvinylidene fluoride, polychlorotrifluoroethylene, or a combination thereof.

12. The polymer composition of claim 10, wherein the fluoropolymer is coated onto carrier particles.

13. The polymer composition of claim 12, wherein the carrier particles include silicate particles.

14. The polymer composition of claim 1, further comprising an inorganic filler in an amount of from about 10 to about 95 parts by weight per 100 parts by weight of the liquid crystalline polymer.

15. The polymer composition of claim 14, wherein the inorganic filler contains particles having a hardness value of about 2.5 or more based on the Mohs hardness scale.

16. The polymer composition of claim 15, wherein the particles include barium sulfate.

17. The polymer composition of claim 1, further comprising an impact modifier in an amount from about 0.1 to about 20 parts by weight per 100 parts by weight of the liquid crystalline polymer.

18. The polymer composition of claim 17, wherein the impact modifier includes an epoxy-functionalized olefin copolymer.

19. The polymer composition of claim 1, further comprising an antistatic filler in an amount from about 0.1 to about 20 parts by weight per 100 parts by weight of the liquid crystalline polymer.

20. The polymer composition of claim 19, wherein the antistatic filler includes an ionic liquid.

21. The polymer composition of claim 1, wherein the liquid crystalline polymer contains repeating units derived from terephthalic acid, isophthalic acid, 2,6-naphthalenedicarboxylic acid, 4-hydroxybenzoic acid, 6-hydroxy-2-naphthoic acid, hydroquinone, 4,4'-biphenol, acetaminophen, or a combination thereof.

22. The polymer composition of claim 1, wherein the composition exhibits a dynamic coefficient of friction of about 1.0 or less as determined in accordance with VDA 230-206:2007.

23. The polymer composition of claim 1, wherein the composition exhibits a wear depth of about 500 micrometers or less as determined in accordance with VDA 230-206: 2007.

24. The polymer composition of claim 1, wherein the composition exhibits a spiral flow length of about 15 millimeters or more as determined in accordance with ASTM D3121-09.

25. A molded part comprising the polymer composition of claim 1.

26. A camera module comprising the molded part of claim 25.

* * * * *